United States Patent
Rao et al.

(10) Patent No.: US 9,537,591 B2
(45) Date of Patent: Jan. 3, 2017

(54) METHOD FOR ZERO TRAFFIC HIT SYNCHRONIZATION SWITCHOVER IN TELECOMMUNICATION NETWORK

(75) Inventors: Srinivas Rao, Bangalore (IN); Gajendra Singh Ranka, Bangalore (IN)

(73) Assignee: TEJAS NETWORKS LTD, Bangalore (IN)

( * ) Notice: Subject to any disclaimer, the term of this patent is extended or adjusted under 35 U.S.C. 154(b) by 148 days.

(21) Appl. No.: 14/008,552

(22) PCT Filed: Jul. 7, 2011

(86) PCT No.: PCT/IB2011/053022
§ 371 (c)(1),
(2), (4) Date: Sep. 29, 2013

(87) PCT Pub. No.: WO2012/131445
PCT Pub. Date: Oct. 4, 2012

(65) Prior Publication Data
US 2014/0022887 A1    Jan. 23, 2014

(30) Foreign Application Priority Data

Mar. 30, 2011 (IN) .......................... 1031/CHE/2011

(51) Int. Cl.
*H04J 3/06* (2006.01)
*G06F 11/20* (2006.01)

(52) U.S. Cl.
CPC ......... *H04J 3/0638* (2013.01); *G06F 11/2028* (2013.01); *G06F 11/2033* (2013.01); *H04J 3/0641* (2013.01); *G06F 11/2038* (2013.01)

(58) Field of Classification Search
None
See application file for complete search history.

(56) References Cited

U.S. PATENT DOCUMENTS

| | | | |
|---|---|---|---|
| 5,377,206 A * | 12/1994 | Smith | 714/797 |
| 5,515,403 A * | 5/1996 | Sloan | G06F 1/12 327/144 |
| 5,517,638 A * | 5/1996 | Szczepanek | H04L 7/0083 327/141 |
| 5,740,211 A * | 4/1998 | Bedrosian | 375/371 |
| 6,194,969 B1 * | 2/2001 | Doblar | 331/2 |
| 6,239,626 B1 * | 5/2001 | Chesavage | G06F 1/08 327/147 |

(Continued)

*Primary Examiner* — Wei Zhao
*Assistant Examiner* — Ronald H Davis
(74) *Attorney, Agent, or Firm* — Deborah Gador

(57) ABSTRACT

Embodiments of the present disclosure relate to a Zero traffic hit synchronization switch over technique in a telecommunication network. The switch over is carried out by switching input reference of the receiver from one or more master (1) to at least one slave (2), wherein said slave (2) becomes new master (2) and said one or more master (1) becomes new slave (1) after switching. Now, the new master (2) locks to the new slave (1) for predetermined time period. Once the predetermined is elapsed, the new master (2) is disconnected from the new slave (1), wherein said new master (2) selects its own network reference clock upon disconnection of the new slave (1). The new slave (1) is locked to the new master (2) to synchronize the switchover in redundant systems.

12 Claims, 3 Drawing Sheets

(56) References Cited

U.S. PATENT DOCUMENTS

| | | | |
|---|---|---|---|
| 6,757,350 B1* | 6/2004 | Chesavage | G06F 11/1604 375/376 |
| 7,350,116 B1* | 3/2008 | Parrish | 714/55 |
| 2005/0099940 A1 | 5/2005 | Chenoja et al. | |
| 2005/0149775 A1* | 7/2005 | Van Den Berg | G06F 1/10 714/1 |
| 2006/0072624 A1 | 4/2006 | Akita et al. | |
| 2006/0139081 A1* | 6/2006 | Van Den Berg | 327/291 |
| 2006/0197558 A1* | 9/2006 | Starr | G06F 1/08 327/99 |
| 2009/0324215 A1* | 12/2009 | Yin | H04J 3/0688 398/2 |
| 2010/0134159 A1* | 6/2010 | Jin | 327/156 |
| 2010/0229034 A1* | 9/2010 | Kanaya | G06F 1/04 714/10 |
| 2011/0063766 A1* | 3/2011 | Kasztenny et al. | 361/63 |
| 2012/0074994 A1* | 3/2012 | Zhong | H03L 7/0805 327/153 |
| 2012/0169373 A1* | 7/2012 | Langadi | G06F 1/08 326/93 |

* cited by examiner

METHOD FOR ZERO TRAFFIC HIT SYNCHRONIZATION SWITCHOVER IN TELECOMMUNICATION NETWORK

CROSS-REFERENCE TO RELATED APPLICATION

The present application claims priority to Indian patent application serial number 1031/CHE/2011 filed on Mar. 30, 2011, and claims the benefit of international application PCT/IB2011/053022 filed Jul. 7, 2011, the entire contents of which are incorporated by reference.

TECHNICAL FIELD

Embodiments of the present disclosure relate to field of telecommunications. More particularly, embodiments relate to clock synchronization and fault protection for a telecommunications device. In particularly, embodiments relate to method and apparatus for zero traffic hit synchronization switchover in redundant systems.

BACKGROUND

Many telecommunications switching systems might include plurality of I/O Cards (called line cards) for processing different data from network interfaces like E1, DS1, STM-n, OC-n etc and send this processed data to traffic switch (Called Switch card) to switch data from one network interface to other. In such telecommunication systems the data from Line cards to switch card passes over a backplane which connects various cards in a system. Such telecommunication system is called network element. In a network there is plurality of such network elements. In networks like SONET/SDH, all these network elements need to work in locked mode traceable to PRC (Primary reference clock). For more information on network synchronization in SDH refer ITU-T standard G.813 and G.825. The synchronization from one network element to other is passed over various interfaces like E1, DS1, STM-n, OC-n etc. Each network element extract synchronization clock from one of these predefined interfaces and synchronize the network element (system synchronizer) so that all the outgoing interface from the said network element are in sync.

Further, to avoid single point of failure, it is well know method in telecommunication systems to replicate critical sub systems like power supply, switch card, network element controller (Called chassis controller), system synchronizer etc. Such sub systems are called redundant sub systems, one acting as master and one or more acting as slave sub systems.

In such redundant "system synchronizer" sub systems, the line cards, switch cards needs to switch from master synchronizer to slave synchronizer when master sub system fails or user initiates a switch over. In systems where the traffic switch and system synchronizer sub systems are on separate cards, the switch and Line cards need to switch form master synchronizer to slave synchronizer at the same time to avoid ppm (parts per million) difference in the system clock used by traffic switch and Line cards. This is not easily implementable.

Further it is very common to integrate traffic switch and system synchronizer in a single card to achieve more number of network interfaces in a given network element and to reduce cost. Also it is very common to use slave traffic switch using the timing from the slave system synchronizer and master traffic switch using timing from master system synchronizer. In such systems the above said problem (ppm difference in the system clock used by line cards and traffic switch during system synchronizer switch over) is more severe which lead to temporary or permanent logic errors which in turn lead to traffic hit. To recover from permanent traffic errors, system needs to be restarted. For bigger systems this may lead to traffic down for few seconds. Thus, prior techniques often do not allow the system to continue operating, uninterrupted and maintaining substantial data integrity.

In light of the foregoing discussion, there is a need for a method and device to solve the above mentioned problems.

SUMMARY OF THE DISCLOSURE

The shortcomings of the prior art are overcome and additional advantages are provided through the provision of a method and a system as described in the description.

The present disclosure solves the limitations of existing arts by providing a methodology for switchover in redundant system.

In one embodiment, the switch over methodology as disclosed in the disclosure prevents abrupt parts per million (ppm) between the traffic switch and the line blades for achieving the "Zero" traffic hit during switchover.

Additional features and advantages are realized through various techniques provided in the present disclosure. Other embodiments and aspects of the disclosure are described in detail herein and are considered as part of the claimed disclosure.

In one embodiment, the present disclosure provides a method for switchover in redundant system. In the beginning, input reference of the receiver is switched from one or more master (1) to at least one slave (2). Said slave (2) becomes new master (2) and said one or more master (1) becomes new slave (1) after switching. Now, the new master (2) is locked to the new slave (1) for predetermined time period. Once the lock is confirmed, the new master (2) is disconnected from the new slave (1). Upon disconnection of the new slave (1), said new master (2) selects its own network reference clock. At this stage, the new slave (1) is locked to the new master (2) to synchronize the switchover in redundant systems.

In one embodiment, the predetermined time period is system dependent.

In one embodiment, the receiver includes but is not limiting to line card, and switching card.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The novel features and characteristic of the disclosure are set forth in the appended claims. The embodiments of the disclosure itself, however, as well as a preferred mode of use, further objectives and advantages thereof, will best be understood by reference to the following detailed description of an illustrative embodiment when read in conjunction with the accompanying drawings. One or more embodiments are now described, by way of example only, with reference to the accompanying drawings wherein like reference numerals represent like elements and in which:

The figures depict embodiments of the disclosure for purposes of illustration only. One skilled in the art will readily recognize from the following description that alternative embodiments of the structures and methods illustrated herein may be employed without departing from the principles of the disclosure described herein.

DETAILED DESCRIPTION

The foregoing has broadly outlined the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

Embodiments of the present disclosure relate to a method for Zero traffic hit synchronization switch over when the master card (1) is jacked out of the system or user initiates switch over. Early indication of jackout of the master card (1) can be derived using industry standard mechanical ejector indication. Further, throughout the description herein below master, master card and master controller are interchangeably used. In this similar way slave, save card and slave controller are used.

Figure 1:
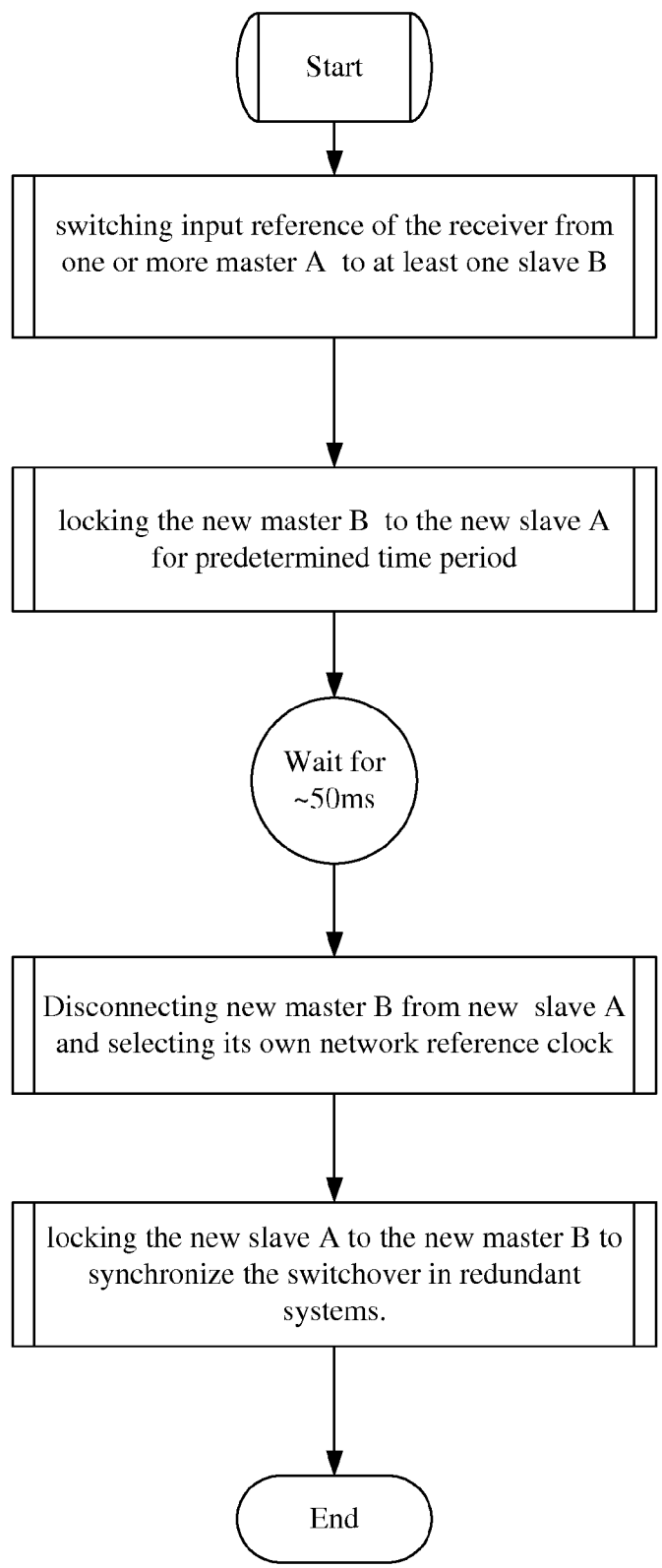
FIG. 1 is a flow chart illustrating a switchover methodology adopted in a redundant system, in accordance with one embodiment of the present disclosure.

Referring now to FIG. 1, which illustrates step by step process adopted in the present disclosure for zero traffic hit synchronization switch over. The redundant network system includes two system synchronizer blades, say A and B. Number of these blades may vary from system to system. System synchronizer blade A is flagged as master blade and system synchronizer blade B is termed as slave blade. In the beginning A is nominated and is locked to network reference clock. Now, slave blade B locks to A. Thus, the slave blade B refers to the network reference clock. After this all line blades locks to A.

While switch over of system synchronization is initiated through GUI or start of master blade Jackout, all line blades switch to reference clock from A to B. However, A still locks to network reference clock and B still locks to A for predetermined time period. The time period can be in the range of 30 ms to 50 ms. However the range can be varied from system to system or network to network. Both A and B will keep track of time elapsed after locking. Once, the predetermined time period is over, for example 50 ms, all line blades locked to B. Now, B goes to hold over state. At this stage full system is synchronized to B except A.

When GUI switch over happens, B nominates the network reference clock and locks to network reference clock. Thereafter, blade A locks to blade B. Further, full system synchronizes to B. Thus, B becomes a master blade and A is slave blade. However, if master blade jackout happens, blade A waits for jack out completion and B nominates the network reference clock and locks to network reference clock. Further, full system synchronizes to B. Thus, B becomes a master blade.

The above sequence of steps would ensure smooth synchronization switch over without any parts per million (ppm) accumulations and thus achieve "Zero" traffic hit.

Figure 2:
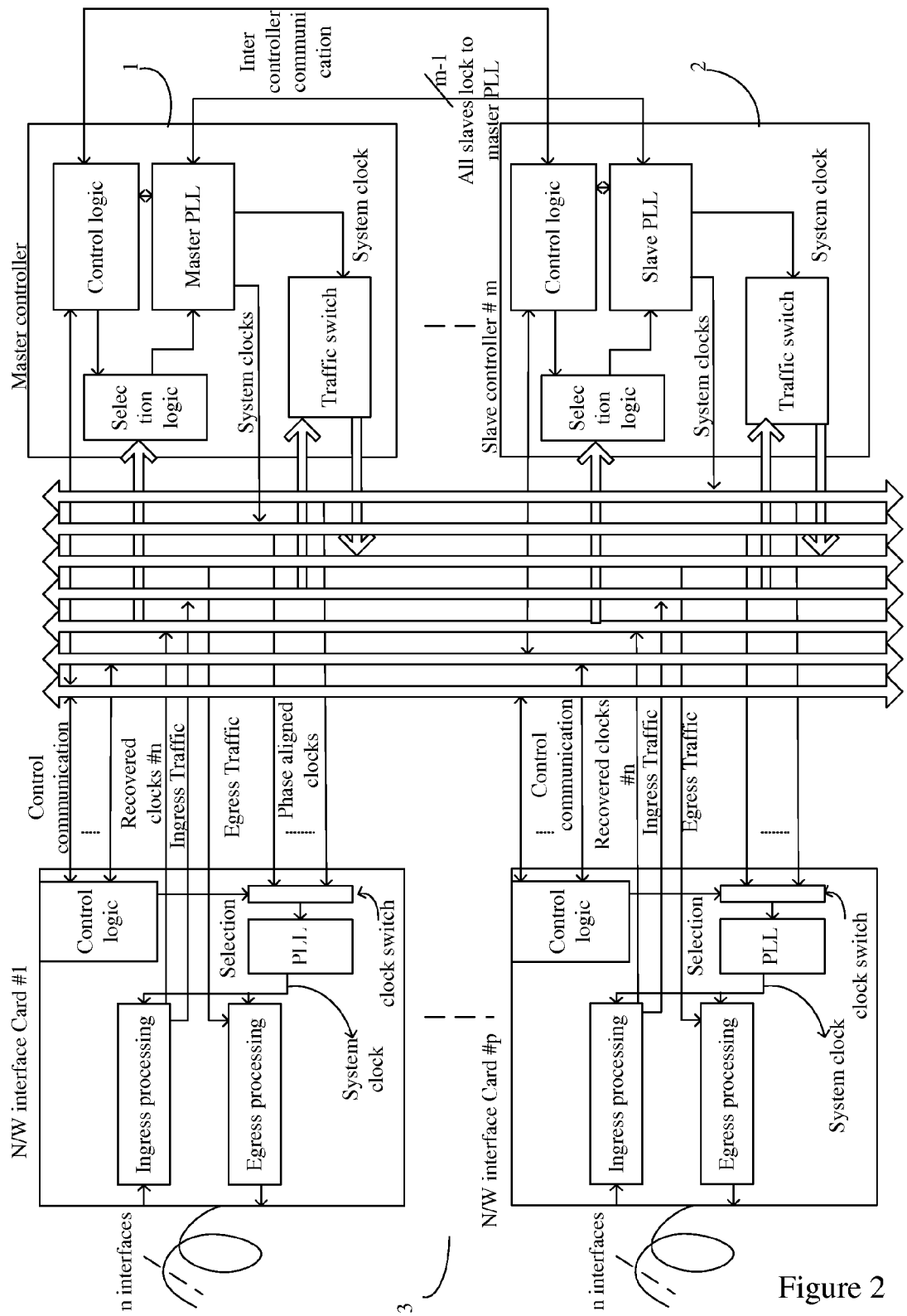
FIG. 2 is a block diagram showing switchover from master blade to slave blade, in accordance with one embodiment of the present disclosure.
Figure 3:
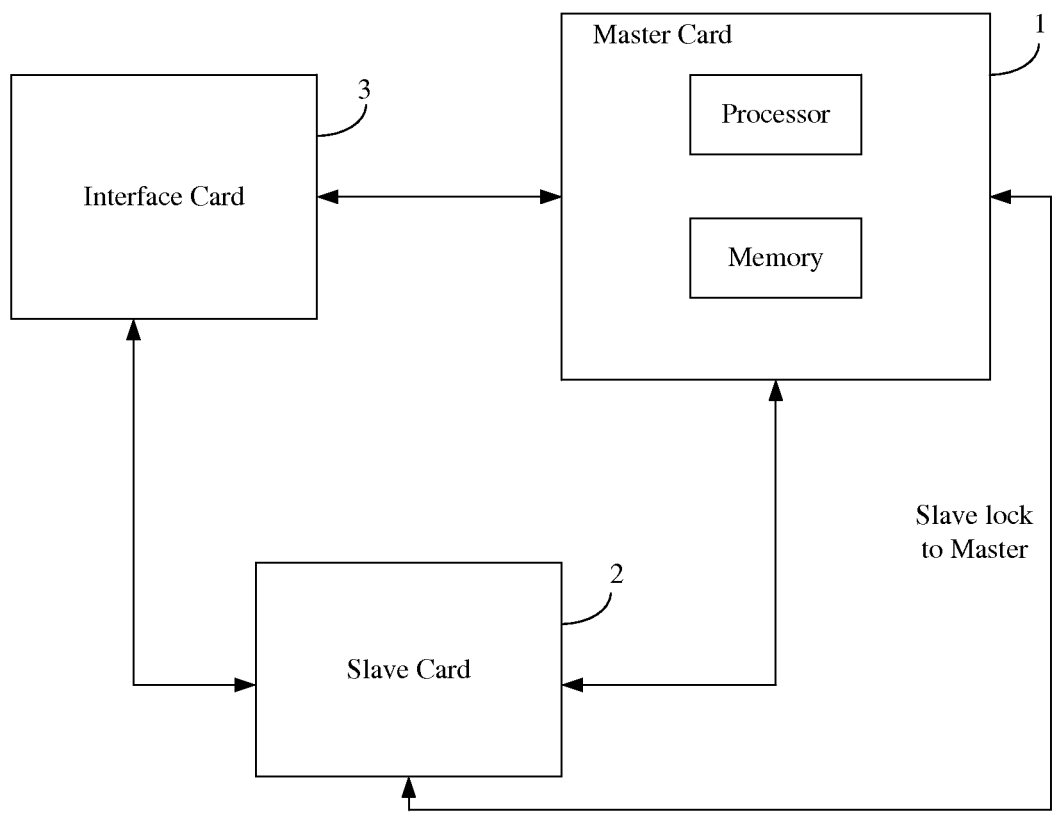
FIG. 3 is a simplified block diagram of network element as shown in FIG. 2, in accordance with one embodiment of the present disclosure.

Referring now to FIG. 2 which illustrates block diagram of network element. The network element includes plurality of network components. The network components includes but are not limited to network interface card (3), traffic switch cards, one or more master controller (1), plurality of slave controller (2). In one embodiment, the network interface card (3) comprises frames processing logic, control logic, PLL logic, selection logic, etc. The detailed explanation of various elements as depicted in FIG. 2 is explained herein below. The simplified block diagram of network element as shown in FIG. 2 is illustrated in FIG. 3.

Network interface card (3) terminates various network interfaces like E1, E3, DS1, DS3, STM-n, OC-n etc. Said network interface card (3) process the ingress traffic and send the processed traffic to the switch card for switching to other network interfaces. Further, the network interface card (3) recovers the clock which is received over the various network interfaces and sends these recovered clocks to one or more synchronization controller. The network interface card (3) changes the network traffic to new network element clock (system clock) domain before sending to the switch. For example, all the elements of SONET/SDH network element work with clock which is frequency locked to one central source for example, master controller PLL.

Any momentary parts per million (ppm) differences between traffic switch and network interface cards (3) lead to FIFO over flow at the interface between network interface card and traffic switch card. This difference may lead to traffic hit. Also, may lead to un-lock of the PLL's in the networks interface cards (3), which lead to the frame losses at the interfaces. The frame losses should not be allowed in the networks like SONET/SDH under equipment protection switch. In order to overcome such problems, the present disclosure provides solution of synchronization switch over technique.

In network elements, typically the traffic switch, Synchronization units are protected by providing the redundant traffic switch and synchronization units. In redundant systems, the network interface card (3), a traffic switch card receives the system clocks from all the redundant elements and selects one of them. The selected element is a master. The selection is done based on the commands from the controller over control communication channels. The selected master includes processor and memory for necessary processing as shown in FIG. 3. In one embodiment, in redundant systems need may arise to switch the timing from master controller (1) to one of the slave controller (2) under faults or user initiated commands. If timing switching from master to slave happens in random sequence, there can be momentary ppm difference between the network interface card (3) and traffic switch which may lead to frame loss, PLL un-lock etc. This is not a required behavior in some of the telecom networks.

Another important element of the network element is controller card. Traffic switch element can be integrated with synchronization controller, wherein the synchronization controller consists of PLL and associated control functions or can be an independent element in the network element. For redundant systems these elements such as Synchronization controller and traffic switch are duplicated in which one of them acting as a master controller (1)/traffic-switch and another as a slave controller (2)/traffic-switch. The master controller (1) receives the network clock from all the network interface cards (3) and selects the high priority clock among these available clocks. The selected reference clock is given to master PLL. The master PLL distribute the clock to various elements in the network element like traffic switch, network interface cards (3). In one embodiment, the master controller (1) synchronizes with network clocks provided by the interface card (3) based on criteria selected from a group comprising the user-defined priority, and statistics. The Slave controllers (2) lock to reference clock from the master PLL. The slave controllers PLL output clocks are phase aligned to that of master controller PLL. The slaves distribute its output clocks to all other element in the network element similar to master. Now the slaves are ready for switch over. Further the master PLL loop bandwidth is as per network requirement and the slave PLL is configured in wide loop bandwidth filter to ensure lesser lock time in the slave PLL. There will be one control communication channel between Master (1) and slave controllers (2) to pass various messages including switch over message.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and devices within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

In addition, where features or aspects of the disclosure are described in terms of Markush groups, those skilled in the art will recognize that the disclosure is also thereby described in terms of any individual member or subgroup of members of the Markush group.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:
1. A method for achieving zero traffic hit synchronization switchover in a telecommunication network including a plurality of line blades, said method comprising acts of:
switching, by a network element, input reference of a receiver from one or more master controller (1), configured to lock to a network reference clock to provide clock signals to the network, to at least one slave controller (2), wherein said at least one slave controller (2) becomes a new master controller (2) and said one or more master controller (1) becomes a new slave controller (1) after switching;
locking, by the network element, the new master controller (2) to the new slave controller (1) for a predetermined time period while line blades synchronize to the new master controller;
disconnecting, by the network element, the new master controller (2) from the new slave controller (1);
selecting, by said new master controller (2), its own network reference clock upon disconnection from the new slave controller (1); and
locking, by the network element, the new slave controller (1) to the new master controller (2) for synchronizing the switchover in redundant systems, and achieving zero traffic hit synchronization switchover.

2. The method as claimed in claim 1, wherein the new slave controller (1) is continuously locked to the new master controller (2) during switching.

3. The method as claimed in claim 1, wherein synchronization during switchover is achieved, by the network element, using a synchronization controller consisting of Phase Locked Loop (PLL) and associated control functions by passing the timing over various network interfaces.

4. The method as claimed in claim 1, wherein the receiver is selected from a group comprising line cards and switching card.

5. The method as claimed in claim 1, wherein the predetermined time period is one of system dependent and user defined.

6. The method as claimed in claim 1, wherein the one or more master controller (1) and the at least one slave controller (2) are selected from at least one of controller card.

7. The method as claimed in claim 6, wherein selection of at least one slave controller (2) to become the new master controller (2) during switch over is performed based on commands from the at least one controller card over control communication channels.

8. The method as claimed in claim 1, wherein the master controller (1) performs: receiving the one or more network reference clock from each of one or more network interface cards (3);
selecting a high priority network reference clock from the received one or more network reference clocks; and
synchronizing itself with the selected network reference clock for achieving a zero traffic hit synchronization switchover.

9. A network element for achieving zero traffic hit synchronization switchover in a telecommunication network including a plurality of line blades, the network element comprising:
at least one interface card (3);
at least one master controller (1) in communication with the at least one interface card (3), wherein the at least one master controller (1) includes a processor and a memory and is configured to lock to a network reference clock to provide clock signals to the network, a plurality of slave controller (2), wherein the at least one slave controller of the plurality of slave controller (2) communicates with the at least one master controller (1) and the at least one interface card (3);

wherein said processor is configured to switch input reference of a receiver from the at least one master controller (1) to at least one slave controller (2), wherein said at least one slave controller (2) becomes a new master controller (2) and said at least one master controller (1) becomes a new slave controller (1) after switching;

lock the new master controller (2) to the new slave controller (1) for a predetermined time period while line blades synchronize to new master controller (2);

disconnect the new master controller (2) from the new slave controller (1), cause said new master controller (2) to select its own network reference clock upon disconnection of the new slave controller (1); and lock the new slave controller (1) to the new master controller (2), synchronize the switchover in redundant systems, and achieve zero traffic hit synchronization switchover.

10. The network element as claimed in claim 9, wherein the at least one master controller (1) receives network clocks from the at least one interface card (3).

11. The network element as claimed in claim 10, wherein the at least one master controller (1) synchronizes with the network clocks provided by the at least one interface card (3) based on criteria selected from a group comprising a user-defined priority, and statistics.

12. The network element as claimed in claim 10, wherein the at least one slave controller (2) receives the network clocks from the at least one interface card (3), wherein said at least one slave controller synchronizes with the at least one master controller (1).

* * * * *